United States Patent
Snider et al.

(10) Patent No.: US 8,322,145 B2
(45) Date of Patent: Dec. 4, 2012

(54) SYSTEMS AND METHODS FOR PROVIDING SURGE PROTECTION TO A TURBINE COMPONENT

(75) Inventors: David August Snider, Simpsonville, SC (US); Harold Lamar Jordan, Jr., Greenville, SC (US); Timothy Andrew Healy, Simpsonville, SC (US); John David Stampfli, Greer, SC (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 12/428,769

(22) Filed: Apr. 23, 2009

(65) Prior Publication Data

US 2010/0269481 A1 Oct. 28, 2010

(51) Int. Cl.
F02C 7/00 (2006.01)

(52) U.S. Cl. ........................ 60/779; 60/39.091; 60/39.24

(58) Field of Classification Search .................... 60/779, 60/39.091, 39.24, 782, 785, 795; 415/1, 415/48, 17, 23, 29, 26, 28, 47, 50, 49; 416/35; 700/287, 289, 290; 706/903, 905; 703/7, 703/8

See application file for complete search history.

(56) References Cited

U.S. PATENT DOCUMENTS

| | | | |
|---|---|---|---|
| 5,857,321 A * | 1/1999 | Rajamani et al. ............ | 60/39.27 |
| 6,364,602 B1 | 4/2002 | Andrew et al. | |
| 2007/0031238 A1 | 2/2007 | Fujii et al. | |

* cited by examiner

*Primary Examiner* — Ehud Gartenberg
*Assistant Examiner* — Vikansha Dwivedi
(74) *Attorney, Agent, or Firm* — Sutherland Asbill & Brennan LLP

(57) ABSTRACT

Systems and methods for providing surge protection to turbine components are provided. A surge protection limit may be determined for the turbine component. One or more measurements associated with operation of the turbine component may be received and provided to a cycle model executed to predict an operating condition of the turbine component. The predicted operating condition of the turbine component may be adjusted based at least in part on the received one or more measurements. The surge protection limit may be adjusted based on the adjusted predicted operating condition of the turbine component.

17 Claims, 5 Drawing Sheets

SYSTEMS AND METHODS FOR PROVIDING SURGE PROTECTION TO A TURBINE COMPONENT

FIELD OF THE INVENTION

Embodiments of the invention relate generally to turbines and more specifically to providing adaptive surge protection to turbine components.

BACKGROUND OF THE INVENTION

Gas turbines are utilized in a wide variety of applications, such as in power plants for power generation. During the operation of a gas turbine, the efficiency and specific output power at least partly depends on the elevated combustor-firing temperatures of the gas turbine. Associated with a given combustor-firing temperature is an optimal compressor pressure ratio which maximizes the efficiency of the turbine, and increases with increasing combustor-firing temperature. Accordingly, in gas turbines used for power generation, it is typically desirable to operate a compressor at a relatively high pressure ratio to achieve a higher efficiency.

However, operation of a gas turbine at high compressor pressure ratios may lead to stall/surge of the compressor, a condition which arises when the pressure ratio of the compressor exceeds a critical value at a given compressor speed, resulting in a rapid reduction in compressor discharge pressure. The pressure reduction typically results from flow separation from the compressor blades, giving rise to a reversal of flow in the compressor, known as surge. In stall/surge, the compressor performance falls due to the inability of the compressor to handle the excessive pressure ratio, resulting in a rapid drop in the compressor discharge pressure. Stall/surge may further give rise to continual pressure oscillations in the compressor until some corrective action is taken. Thus, the occurrence of stall/surge in the compressor of a gas turbine engine may impair turbine performance and/or lead to the damage within the gas turbine.

To achieve relatively higher efficiency, gas turbines are often operated near surge conditions. Typically, gas turbines are operated at compressor pressure ratios, which are at a sufficient margin away from the surge boundary to avoid unstable compressor operation. In conventional turbine systems, surge protection logic has typically been static. Thus, the surge margin protection logic, once established for a compressor, may be considered fixed and not varied during the compressor operation. Because a static surge protection has to avoid surge even for the worst case compressor operating conditions, the compressor is often overprotected for a significant portion of its operation, resulting in a loss of performance. Moreover, in cases when a plurality of compressor units are in operation, overcompensation may result in some of the compressor units performing well below par affecting the overall efficiency of the system.

Thus, there is a need for improved systems and methods to provide surge protection to one or more compressor units of a gas turbine, while optimizing the performance of each individual unit.

BRIEF DESCRIPTION OF THE INVENTION

Some or all of the above needs and/or problems may be addressed by certain embodiments of the invention. Embodiments of the invention may include systems, methods, and computer program products for providing surge protection to a turbine component. According to one embodiment of the invention, there is disclosed a method for providing surge protection to a turbine component. A surge protection limit may be determined for the turbine component. One or more measurements associated with operation of the turbine component may be received and provided to a cycle model executed to predict an operating condition of the turbine component. The predicted operating condition of the turbine component may be adjusted based at least in part on the received one or more measurements. The surge protection limit may be adjusted based on the adjusted predicted operating condition of the turbine component.

According to another embodiment of the invention, there is provided a system for providing surge protection to a turbine component. The system may include one or more sensors and one or more processors. The one or more sensors may be operable to measure parameters associated with operation of the turbine component. The one or more processors may be operable to determine a surge protection limit for the turbine component. The one or more processors may further be operable to receive measurement data from the one or more sensors and provide the received measurements data to a cycle model executed by the one or more processors to predict an operating condition of the turbine component. The predicted operating condition of the turbine component may be adjusted based at least in part on the received measurements data. The one or more processors may further be operable to adjust the surge protection limit based on the adjusted predicted operating condition of the turbine component.

According to yet another embodiment of the invention, there is disclosed a computer program product which includes a computer usable medium having an embodied computer readable program code. The computer readable program code may be adapted to be executed to facilitate execution of a cycle model that is operable to predict an operating condition of a turbine component. The computer program product may be further operable to receive one or more measurements associated with operation of the turbine component, and may provide the received one or more measurements to the cycle model. The predicted operating condition of the turbine component may be adjusted based at least in part on the received one or more measurements. The surge protection limit may then be adjusted based on the adjusted predicted operating condition of the turbine component.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
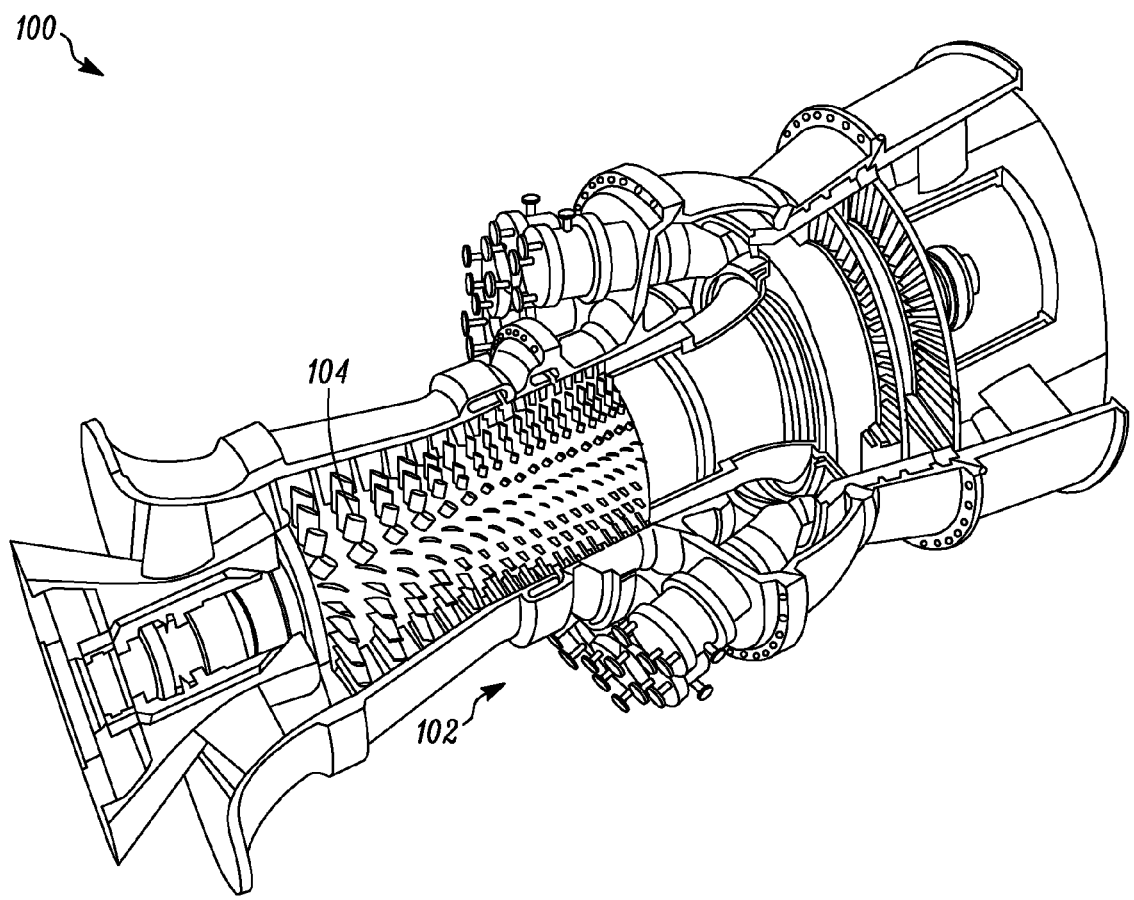

Having thus described the invention in general terms, reference will now be made to the accompanying drawings, which are not necessarily drawn to scale, and wherein:

FIG. 1 is a partly cross-sectional view of one example gas turbine that may be utilized in association with various embodiments of the invention.

Figure 2:
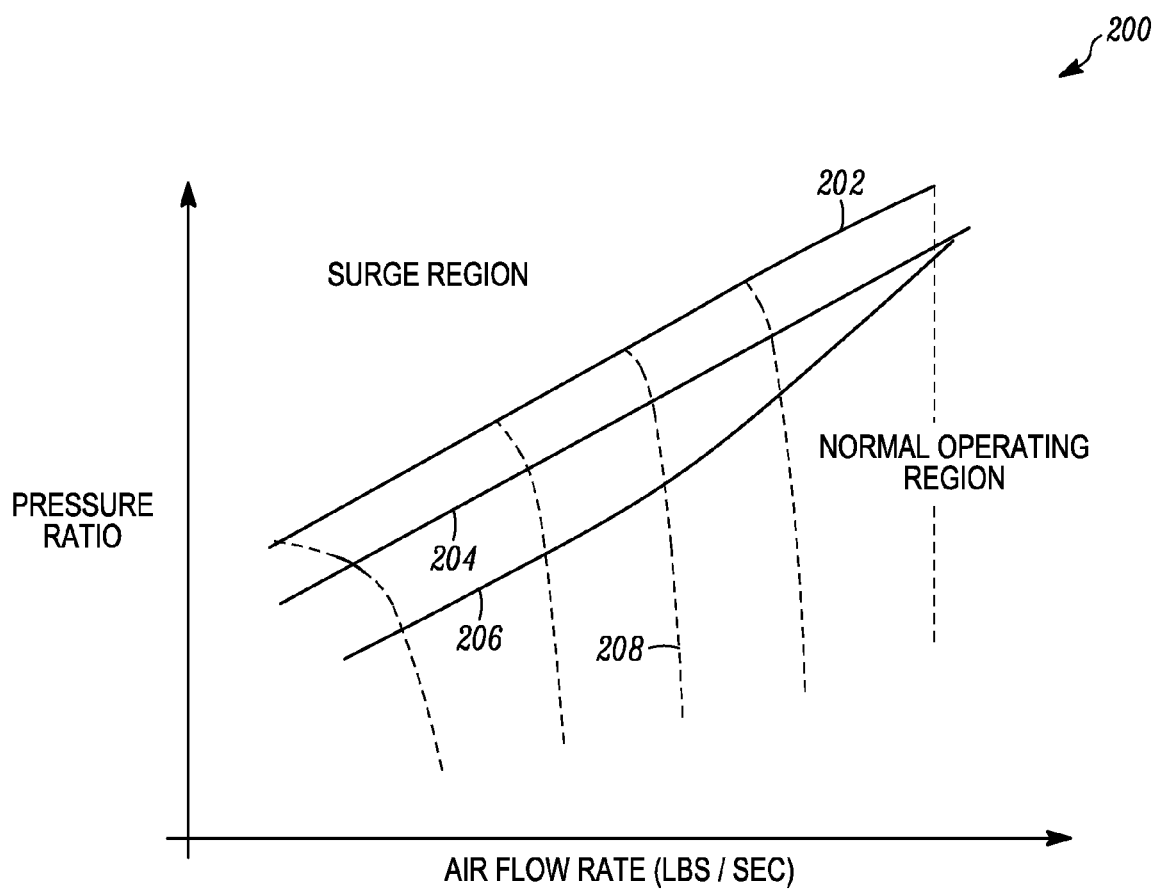

FIG. 2 is an example surge map for a compressor associated with a turbine that may be utilized in association with various embodiments of the invention.

Figure 3:
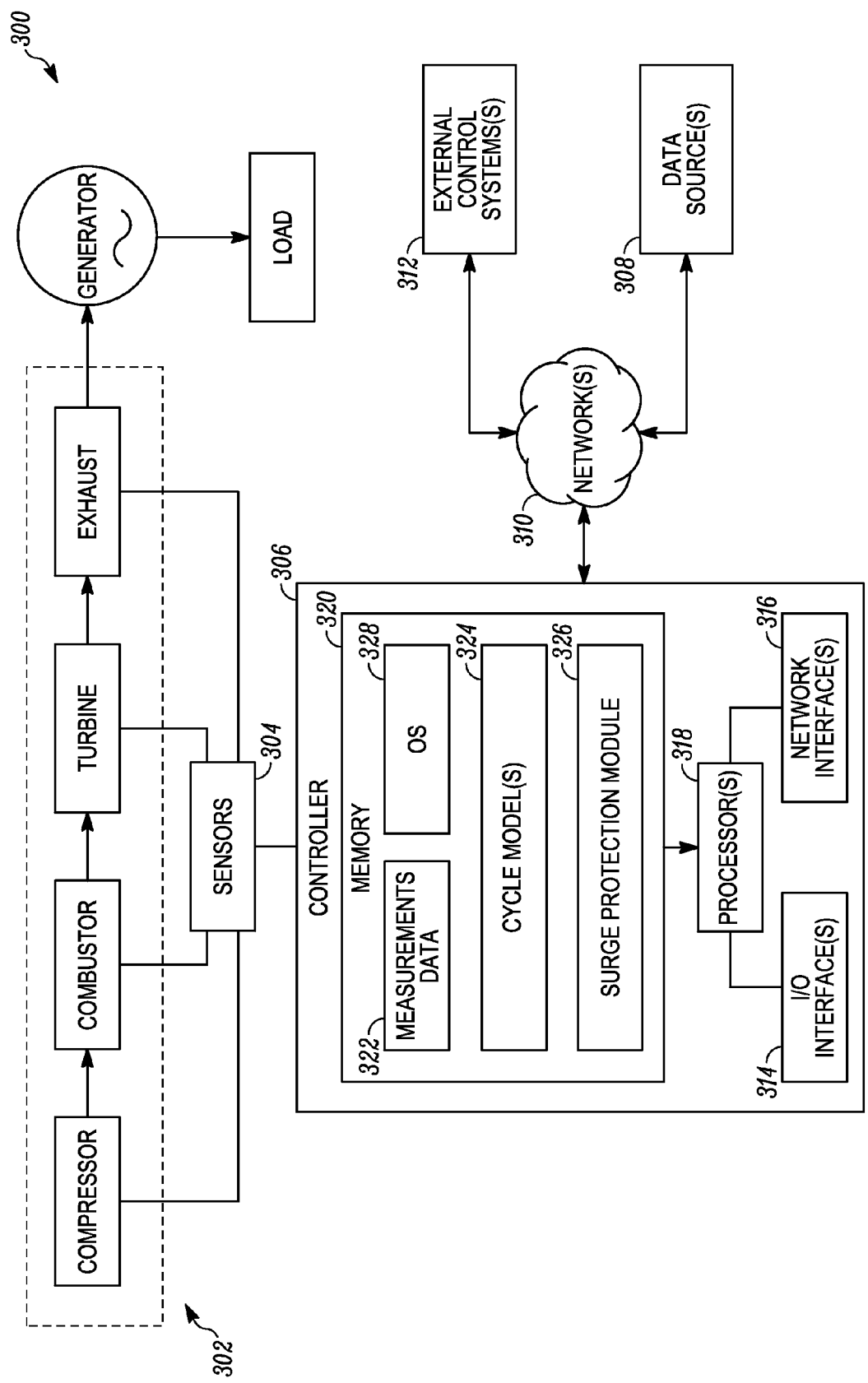

FIG. 3 is a schematic view of one example system that may be utilized to provide surge protection to a turbine component, in accordance with various embodiments of the invention.

Figure 4:
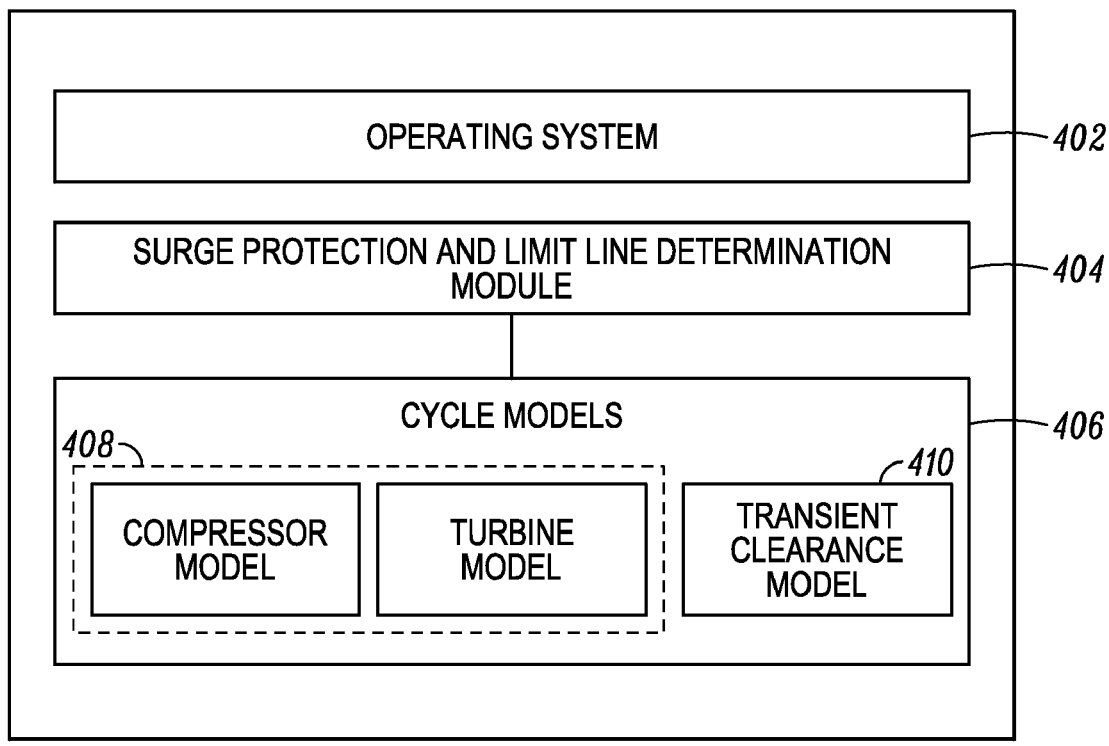

FIG. 4 is a block diagram of example software modules that may be utilized by a system that provides surge protection to a turbine component, in accordance with various embodiments of the invention.

Figure 5:
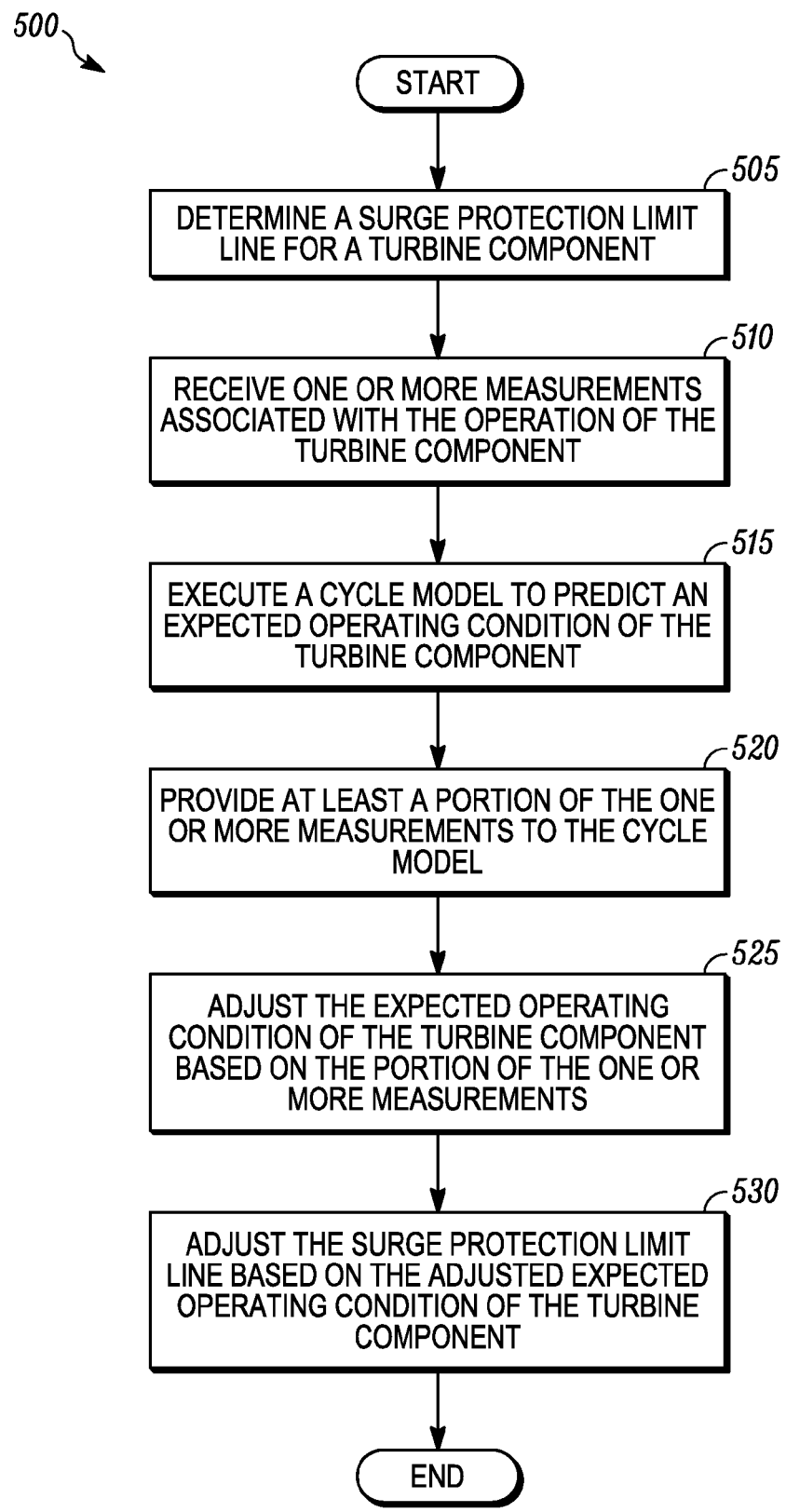

FIG. 5 is a flowchart illustrating one example method for providing surge protection to a turbine component, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods and computer program products for providing surge protection to a turbine component, for example, a compressor of a gas turbine. Various embodiments of the invention may include one or more sensors operable to measure data associated with the operation of the turbine component. Embodiments of the invention may further include one or more processors operable to determine an initial surge protection limit for the turbine component. The processors may be further operable to execute one or more cycle models to predict an expected operating condition of the turbine component in real time or near real time based at least in part on the measurements data received from the sensors. The cycle models may be utilized to adjust the predicted expected operating condition of the turbine component based at least in part on the received measurements data and/or the predicted expected operating condition. The initial surge protection limit may be adjusted based at least in part on the adjusted predicted operating condition of the turbine component. In this regard, the turbine component may be operated below an appropriate surge line while the operating efficiency of the turbine is increased and/or maximized. For a plurality of turbine units, one or more cycle models may be operable to generate and adjust the predicted operating condition and the surge protection limit of each unit, based on the operating conditions of each turbine unit in real time or near real time. In this regard, overprotection and/or overcompensation may be avoided for units which are not operating near worst case operating conditions, while at the same time providing surge protection to the units operating near worst case conditions, thus increasing the efficiency of the overall system.

Various embodiments of the invention may include one or more special purpose computers, systems, and/or particular machines for providing surge protection to turbine components. A special purpose computer or particular machine may include a wide variety of different software modules as desired in various embodiments, for example, a surge protection module and one or more cycle models. These various software components may be utilized to provide a relatively accurate and stable behavioral representation of a turbine component. One example of a cycle model that may be utilized is an onboard cycle model that facilitates the determination of an operating condition of a turbine component in real time or near real time. Based at least in part on the determined operating condition, a surge protection software module may be operable to adjust an initially determined surge protection limit line to increase the operating efficiency of the engine. The use of onboard cycle models may facilitate the determination of the expected operating condition of the turbine component in real time or near real time, and under all operating conditions. This real time or near real time simulation and determination of the expected operating condition of the turbine component may ensure stability and optimum performance even under extreme operating conditions.

Embodiments of the invention described herein may have the technical effect of providing dynamic or variable surge protection in turbine components. A surge protection limit line for a turbine component may be adjusted in real time or near real time during the operation of the turbine. As a result, the efficiency of the turbine may be increased.

FIG. 1 shows one example gas turbine 100 that may be utilized in association with various embodiments of the invention. The gas turbine 100 may be utilized as a stand alone turbine or may form a part of a combined cycle configuration that also includes, for example, steam turbines and generators to generate electrical power. Various embodiments of the invention may be utilized in association with a wide variety of different turbines or other machines, for example, steam turbines, gas turbines, etc and within different components of a turbine for example, a compressor or other turbine component. By way of non-limiting example only, embodiments of the invention are described with reference to a compressor section of a gas turbine.

The example gas turbine 100 may be utilized in association with a generator to form a simple cycle system. Additionally or alternatively, the example gas turbine 100 may be coupled to a steam turbine in a combined cycle system for power generation applications. In either the combined or simple cycle system, it is desirable for the operation of the gas turbine 100 to facilitate the highest operating efficiency to produce high power output at relatively low costs. Since the efficiency of the gas turbine 100 is directly proportional to the combustor-firing temperature, as the combustor-firing temperature increases, the operating efficiency also increases.

Moreover, associated with the combustor-firing temperature is a compressor pressure ratio, which increases with an increase in combustor-firing temperature. Thus, as the firing temperature is increased to increase the operating efficiency of the gas turbine 100, the compressor pressure ratio may also increase. The compressor 102 of the gas turbine 100 may work to maintain a desired compressor pressure ratio for the efficient operation of the gas turbine 100. However, a high compressor pressure ratio operation may result in aerodynamic instabilities in the compressor 102, such as a stall and/or surge which adversely affect the components and/or the operational efficiency of the gas turbine 100. However, the operating condition or region of the compressor 102 may be controlled by controlling certain critical turbine control parameters, such as angle of the inlet guide vanes 104, fuel flow in the combustor, etc. In certain embodiments, the turbine control parameters may depend on various operating parameters, for example, compressor inlet and outlet temperatures and pressures, exhaust temperature and pressure, and the like. These operating parameters may be utilized to facilitate the optimal control of the turbine control parameters to achieve optimum performance. Thus, by the suitable control of certain operating parameters, the operation of the compressor 102 may be limited to an operational region which prevents the gas turbine 100 from stalling and/or surging. In the following paragraphs, FIG. 2 illustrates the relationship of stable and unstable operating conditions/regions of a turbine with one or more turbine operating parameters, while FIG. 3 discusses example embodiments of a method, system or apparatus which facilitates the determination of these turbine operating parameters in real time or near real time.

FIG. 2 illustrates an example surge map 200 for an example turbine compressor. FIG. 2 illustrates example operational regions for a compressor, such as the compressor 102 shown in FIG. 1. The surge map 200 shows compressor pressure ratio plotted as a function of corrected airflow rate. The pressure ratio is the ratio of outlet pressure to inlet pressure of the compressor. Further, the corrected airflow rate (pounds (lbs) per second) is the weight of air discharged from the compressor over time. Both the pressure ratio and the corrected airflow rate may be obtained by measuring various compressor flow parameters. For example, the inlet pressure may be obtained by measuring the pressure at the inlet of the compressor by a pressure tube, while the outlet pressure may be similarly measured by a pressure tube positioned at the outlet of the compressor. These pressure measurements may be converted to electrical signals by one or more sensors and may be further processed to provide the pressure ratio. Further, the corrected airflow rate is proportional to a differential pressure measured at either the inlet or the outlet of the compressor. Hence, differential pressure measurements may be converted to electrical signals by one or more sensors to provide the corrected airflow rate.

Referring to FIG. 2, the surge map 200 illustrates a surge line 202 representing the limit within which the compressor 102 of an example gas turbine, such as the turbine 100 shown in FIG. 1, can safely operate without the occurrence of a surge and/or stall. The efficiency of a turbine may be highest when operating as close to the surge line 202 as possible without going beyond. Thus an operating limit line 204 may be defined and set at a predetermined limit or margin away from the stall/surge line 202 to ensure safe operation of the turbine. This predetermined limit or margin may also be referred to as the surge limit or the surge margin. Additionally, an operating line 206 is also shown in FIG. 2, which is a line along which a turbine, such as the gas turbine 100 normally operates. While the operating limit line 204 represents the maximum aerodynamic load beyond which the operation of the compressor is not safe, the operating line 206 represents the aerodynamic-thermodynamic equilibrium between the operations of the various gas turbine components.

The surge line 202 shown on the surge map 200 may be determined empirically by detecting the compressor pressure ratio at which the compressor enters a surge condition for selected values of the corrected compressor speed. The speed of the example compressor 102 and the position of the inlet guide vanes (IGV) 104 may affect the location of the operating position on the surge map 200. For example, at a constant compressor speed, the pressure ratio increases with a decrease in airflow rate until the compressor reaches a surge condition as shown in FIG. 2. Thus, operating parameters governing the operation of the various components of the example gas turbine 100 may at least partly determine the position/location of the operating line 206 relative to the operating limit line 204.

However, the airflow in the various turbine components and/or the operating conditions may change in real time, thereby leading to a change in the location of the operating line 206. The change in operating condition in turn may lead to a change in the operating parameters. Moreover, the surge line 202 itself may be influenced by operating parameters such as temperature, tip clearance, blade wear, compressor speed etc. Thus the surge line for the turbine may change in real time. Accordingly, there is a need for a control system which predicts a change in the operating line 206 in real time and accordingly adjusts the surge line 202 in real time such that the operation of the turbine may be maintained close to the surge line 202, thereby providing relatively higher efficiency. In various embodiments of the invention, the operating limit line 204, and thus the operating line 206 may be moved closer towards the surge line 202 in real time or near real time based at least in part on the change in the operating parameters in real time that affect the location of the operating limit line 204. With the operating limit line 204 closer to the surge line 202, the various operating parameters associated with the operation of the gas turbine 100 may be controlled such that the operating line 206 is closer to the operating limit line 204, hence realizing relatively higher operational efficiency and increased power output.

FIG. 3 is a schematic view of one example system 300 that may be utilized to provide surge protection to a turbine component in accordance with various embodiments of the invention. FIG. 3 illustrates a system 300 that may be operable to predict the operating condition of a gas turbine 302, and accordingly adjust the surge limit of a turbine component, such as a compressor, in real time or near real time. The gas turbine 302 may include a compressor component in serial-flow communication with a combustor component which leads to a turbine, and subsequently to an exhaust. The turbine may be operable to drive a generator coupled to a load. Further, one or more sensors 304 may be coupled to one or more of the components of the gas turbine 302 to sense and/or measure one or more operating parameters associated with the turbine, such as, inlet and outlet temperatures and pressures, exhaust temperature and pressure, compressor speed, inlet guide vane angle, etc. The measurements made by the sensors may be referred to as measurement data. Examples of suitable sensors or sensing devices include, but are not limited to, voltage sensors, pressure sensors, temperature sensors, speed sensors, position sensors, etc.

A controller 306 may receive measurements data from the one or more sensors 304. Additionally, in certain embodiments, the controller 306 may receive measurements data and/or other data from one or more external data sources 308 through any number of suitable networks 310, such as, a local area network (LAN), a wide area network (WAN), the Internet, or any other network capable of transmitting data. In certain embodiments of the invention, an external data source 308 may be a source of stored data associated with the operation of the turbine 102 and/or one or more components of the turbine 102. In certain embodiments, the controller 306 may simultaneous process real time data received from the sensors 304 and stored data from the external data sources 308 to provide a more accurate prediction of the operating condition of the turbine component. In other embodiments, the external data source 308 may include real time data and may be coupled to the controller 306 either independently or in conjunction with the one or more sensors 304 to provide measurement data to the controller. Moreover, in various embodiments of the invention, the controller 306 may be at least partially controlled by one or more external control systems 312 that are in communication with the controller 306 via one or more suitable networks, such as network 310.

The controller 306 may be a processor driven device that facilitates the dynamic determination of a surge protection limit for a turbine component. For example, the controller 306 may include any number of special purpose computers or other particular machines, application specific circuits, programmable logic controllers (PLC), microcontrollers, personal computers, minicomputers and the like. In certain embodiments, the operations of the controller 306 may be controlled by computer-executed or computer-implemented instructions that are executed by one or more processors associated with the controller 306. The instructions may be embodied in one or more software components as desired in various embodiments of the invention. The execution of the instructions may form a special purpose computer or other particular machine that is operable to determine a surge protection limit for a turbine component.

The controller 306 may include one or more input/output ("I/O") interfaces 314, one or more network interfaces 316, one or more processors 318, and/or one or more memory devices 320. The I/O interfaces 314 may facilitate communication between the controller 306 and one or more input/output devices, for example, the sensors 304, a universal serial bus port, a serial port, a disk drive, a CD-ROM drive, infrared receiver, and/or one or more user interface devices, such as, a display, keyboard, mouse, keypad, control panel, touch screen display, remote control, microphone, etc. that facilitate user interaction with the controller 306. The one or more I/O interfaces may be utilized to receive or collect measurements data and/or other data from a wide variety of sensors and/or input devices.

The one or more network interfaces 316 may facilitate connection of the controller 306 to one or more suitable networks 310, for example, a local area network, a wide area network, the Internet, or any other network capable of transmitting data. In this regard, the controller 306 may receive measurements data and/or control data from other network devices and/or systems, such as, the data sources 308 and/or the external control systems 312. Additionally, in some embodiments, the network interfaces 316 may be utilized to receive measurements data from the sensors 304.

The one or more processors 318 may be operable to receive measurements data associated with the operation of the turbine component from the sensors 304 and/or the external data 310. The one or more processors 318 may utilize any number of software applications, as discussed in greater detail below, to process the measurements data and dynamically determine surge protection parameters for the turbine component. Examples of measurements data associated with the operation of the turbine component include, but are not limited to, measurement of inlet guide vane of the turbine component, a temperature of the turbine component, a pressure of the turbine component, an inlet bleed heat of the turbine component, and/or a clearance of the turbine component, and may include any other measurement data pertinent to the operation of the turbine component.

The one or more memory devices 320 may be any suitable memory devices, for example, caches, read only memories, random access memories, magnetic storage devices, etc. The memory devices 320 may store data, executable instructions, and/or various program modules utilized by the controller 306, for example, measurements data 322 associated with the operation of the turbine component, an operating system 328, one or more cycle models 324 that facilitates dynamic prediction and adjustment of a turbine operating condition, and/or a surge protection module 326 that facilitates dynamic adjustment of the surge protection limit. The cycle model 324 and the surge protection module 326 are examples of software modules that may be utilized by the controller 306. The operating system (OS) 328 may facilitate the general execution and/or operation of the controller and the execution of one or more other software modules by the controller 306. The processor 318 may utilize the operating system 328 to implement programmed logic in the cycle model 324 and the surge protection module 326, and in doing so, may utilize the data in the measurements data 322. The implemented programmed logic may include computer instructions for the one or more processors 318 to execute the cycle model 324 and/or the surge protection module 326. Thus the controller 306 may execute the software to form a special purpose or particular machine for providing surge protection to a turbine component.

In an example operation of the system 100, the processors 318 included in the controller 306 may receive the measurements data and provide at least a portion of the received measurements data to the one or more cycle models 324 executed by the processors 318 in order to predict an operating condition of the turbine component. In one example embodiment, a cycle model 324 may be an onboard cycle model and may represent a model of a gas turbine cycle. The onboard cycle model 324 may include turbine component maps which describe the behavior of different components of the turbine under a given set of measurement data/operating factors in real time or near real time. Moreover, the on board cycle model 324 may include a plurality of mathematical models to form an active control system, and facilitate fast and accurate calculation at a wide variety of different operating points and under a wide variety of operating conditions of the turbine. The onboard cycle model 324 may be operable to predict an operating condition of the turbine component in real time or near real time based at least in part on the measurements data associated with the turbine operation. The onboard cycle model 324 may be further operable to adjust a predicted operating condition in real time or near real time based partly on the predicted operating condition and/or the one or more measurement data associated with the turbine operation. This adjusted predicted operating condition may thereafter be provided to the surge protection module 326 which facilitates the calculation and/or adjustment of the surge protection limit for the turbine in real time or near real time. Additionally, the surge protection module 326 may include a set of computer implementable instructions for controlling parameters such as guide vane angle, fuel flow control, etc. to dynamically adjust the surge protection limit in real time or near real time. Thus, the controller 306 may form a computer readable program product, which processes the measurement data received from the one or more sensors 304, and transforms the measurement data into control signals operable to control the operating condition of the turbine.

FIG. 4 is a block diagram of example software modules that may be utilized by a system that provides surge protection to a turbine component, such as system 300 illustrated in FIG. 3. FIG. 4 shows a plurality of software modules which may be utilized in conjunction with one another to provide surge protection to a turbine component by dynamically adjusting a surge protection limit and an operating line associated with the turbine component. The various software modules may include an operating system 402, a surge protection and limit line determination module 404 and one or more cycle models 406. A wide variety of different cycle models may be utilized as desired in various embodiments of the invention, for example, an onboard cycle model, various models associated with turbine components, and/or various predictive models. An onboard cycle model may facilitate the dynamic modeling of one or more turbine components based at least in part on measurements data associated with the modeled components. Example component models 408 may include a compressor model and a turbine model. Any number of predictive models, such as a transient clearance model 410, may be utilized as desired in various embodiments of the invention.

The operating system 402 may provide a platform on which one or more other software modules may be executed or run. The various models may receive measurements data from one or more sensors positioned in the compressor and the turbine of the gas turbine. Based at least in part on the measurements data received, the models may predict and/or model the behavior of one or more turbine components. For example, various component models may model the behavior of their respective components. A change in one of the measurements in a turbine may affect the behavior of the corresponding turbine component and, in turn, may affect the behavior of other turbine components. Thus the component behavior determined by the component models 408, and/or the transient clearance model 410 may be further provided to an onboard cycle model which, based in part on the outputs received from the component models 408 and the transient clearance model 410, may be operable to calculate a match point; a preferable/optimized operating point of the turbine components which increases the operating efficiency of the turbine. However, change in flow conditions (degradation) may lead to a change in the measurement data which results in variation of the match point with time. Thus, the component model 408 and the transient clearance model 410 may be used in conjunction with the onboard cycle model to dynamically predict the turbine operating line and adjust it over time.

In conventional gas turbine engines, clearances such as radial clearance between rotor blade tips and stator casing may change dynamically with the compressor speed, the casing temperature, the blade material, etc., and affect the operating efficiency of the turbine. The transient clearance model 410 may operate in conjunction with the onboard cycle model to predict or model clearance conditions within the turbine and/or clearance effects on the surge protection within the turbine. The transient clearance model 410 may be operable to receive measurement data from one or more clearance sensors and/or other sensors. The clearance sensors may facilitate sensing of clearances, such as tip clearances at selective positions in the turbine component such as front end, back end and mid-stage of the turbine component. Based at least in part on the clearances sensed by the clearance sensors placed in strategic positions in the turbine component, the transient clearance model 410 may facilitate the determination of clearances at other positions in the turbine in real time or near real time. The one or more outputs from the transient clearance model 410 may be further provided to the onboard cycle model to facilitate a more accurate prediction of the turbine operating condition. In this regard, a surge protection limit line may be adjusted based at least in part on the clearance conditions. Additionally, the use of the transient clearance model 410 may minimize the need for placing clearance sensors/probes at certain positions in the turbine, which may lead to a disturbance in the airflow inside the turbine.

Additionally, the on board cycle model may be operable to determine an initial surge protection limit for the turbine based at least in part on prestored data and/or on one or more measurements received from the sensors placed in the turbine. The surge protection limit may then be dynamically adjusted in real time or near real time. Examples of one or more measurements which facilitate the dynamic determination of the surge protection limit may include an inlet guide vane angle, a temperature of the turbine component, a pressure of the turbine component, an inlet bleed heat flow, or a clearance of the turbine component. However, to increase the operating efficiency of the turbine, the adjusted predicted operating condition determined by the onboard cycle model may be provided to the surge protection and limit line determination module 404, which may be operable to adjust the surge protection limit dynamically based at least in part on the adjusted operating condition. In various embodiments of the invention, the surge protection module 404 may include computer implementable instructions to control turbine parameters such as guide vane angle, fuel flow, etc., to adjust the operating point relevant to the surge protection limit. Thus, the one or more software modules may form a special purpose machine operable to provide surge protection to the turbine components.

FIG. 5 is a flowchart illustrating one example method 500 for providing surge protection to a turbine component, according to an illustrative embodiment of the invention.

The method 500 may begin at block 505. At block 505, a surge protection limit line may be determined for a turbine component, such as, a compressor of a gas turbine. The surge protection limit line may also be referred to as an operating limit line, for example, an operating limit line similar to the operating limit line 204 illustrated in FIG. 2. A turbine component may be operated below the surge limit line to operate safely without undergoing surge. To ensure the safe operation of a turbine component, a surge protection limit line may be determined for the component. In various embodiments of the invention, the surge protection limit line may be dynamically determined to account for the flow degradation and hence the changing operating conditions of the turbine. In one example embodiment of the invention, the surge protection limit line may be dynamically generated by a predictive software module included in a controller in serial communication with the turbine component. Following the determination of the surge protection limit line, operations may proceed to block 510.

At block 510, one or more measurements associated with the operation of the turbine component may be received. The turbine may include a plurality of sensors or probes placed in different components of the turbine and operable to measure one or more measurements data associated with the operation of the turbine. Examples of one or more measurements data include inlet guide vane angle, inlet and outlet temperature, inlet and outlet pressure, an inlet bleed heat of the turbine component, or clearances in the turbine components. Sensors used to sense the one or more measurement data include, but are not limited to pressure sensors, temperature sensors, position sensors, speed sensors, etc. The predictive module embedded in the controller may receive one or more measurements data. Following the receiving of one or more measurements data, operations may proceed to block 515.

At block 515, a cycle model, such as an onboard cycle model embedded in the controller, may be executed to predict an expected operating condition of the turbine component. The predictive model such as an onboard cycle model, embedded in the controller can include component models operable to mathematically approximate the behavior of the different components of the turbine based on the one or measurements received from the sensors. In various embodiments of the invention, the onboard cycle model may include a set of computer implementable instructions/computer program code to model the operation of the turbine and predict an operating condition of the turbine in real time or near real time. In certain embodiments of the invention, the onboard cycle model may work in conjunction with a transient clearance model to provide a more accurate prediction of the expected operating condition of the turbine. The transient clearance model may model the clearances in different parts of the turbine. The output of the transient clearance model is further provided to the cycle model to facilitate the determination of the changed response of the turbine components to the dynamically changing clearances in the system, thus resulting in an improved prediction of the expected operating condition of the turbine. One or more processors included in the controller, and operable to perform computer implemented instructions may execute the onboard cycle model. Thus, embodiments of the invention involving the one or more processors operable to implement computer program logic to predict the expected operating condition of the turbine may form a special purpose machine for providing surge protection to turbine components. Following the execution of the onboard cycle model, operations may proceed to block 520.

At block 520, a portion of the one or more measurements may be provided to the onboard cycle model. The one or more measurements received from the plurality of sensors and used in prediction of the expected operating condition of the turbine component may be provided to the onboard cycle to facilitate the adjustment of a predicted operating condition associated with the turbine component. In this regard, the predicted operating condition of the turbine component may be dynamically adjusted based at least in part on the operation of the turbine. Operations may then proceed to block 525.

At block 525, the expected operation of the turbine component may be adjusted based on at least a portion of the one or more measurements. The one or more measurements may change dynamically leading to a change in the expected operating condition of the turbine component. Based at least in part on the one or more measurements provided to the onboard cycle model in block 520, the onboard cycle model may adjust the expected operating condition of the turbine component. Following the adjustment of the expected operating condition of the turbine component, operations may proceed to block 530.

At block 530, the surge protection limit line may be adjusted based on the adjusted expected operating condition of the turbine component. A surge protection software module included in the controller may be operable to adjust the surge protection limit line initially determined by the cycle model. To increase the operating efficiency of the turbine, the system needs to operate as close to the surge limit line as possible. Thus, given an expected operating condition of the turbine which defines an operating line of the turbine, the surge limit line may be adjusted to bring the surge limit line closer to the operating line of the turbine. The surge limit line may be adjusted based at least in part on the adjusted expected operating condition of the turbine. Thus, the one or more measurements data received from the sensors by the controller may be processed and transformed into signals for controlling the turbine actuators like fuel flow valves, and inlet guide valves etc.

The method 500 may end following block 530.

The operations described in the method 500 of FIG. 5 do not necessarily have to be performed in the order set forth in FIG. 5, but instead may be performed in any suitable order. Additionally, in certain embodiments of the invention, more or less than all of the elements or operations set forth in FIG. 5 may be performed.

Embodiments of the invention may be applicable to different types of turbines, such as steam turbine, gas turbine, and the like. The surge controller in the invention may find application in any compression (pumping) system that includes a compressor subject to the risk of rotating stall and/or surge. Examples include gas turbine engines and cooling systems, such as some air conditioning systems or refrigeration systems. The invention may further find application in a variety of compressors, including axial flow compressors, industrial fans, centrifugal compressors, centrifugal chillers, and blowers. Moreover, embodiments of the invention may be pertinent to different components of a turbine such as a compressor component and a turbine component of a turbine. It will be apparent that any example taken/provided in the foregoing specification is merely provided for explanation purposes and does not limit the scope of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for providing surge protection to a turbine component, the method comprising:
   determining a surge protection limit for the turbine component;
   receiving one or more measurements associated with operation of the turbine component;
   providing the received one or more measurements to a cycle model executed to predict an operating condition of the turbine component, wherein the predicted operating condition of the turbine component is adjusted based at least in part on the received one or more measurements;
   adjusting the surge protection limit based on the adjusted predicted operating condition of the turbine component;
   receiving one or more outputs from a predictive model other than the cycle model; and
   providing the received one or more outputs to the cycle model, wherein the predicted operating condition of the turbine component is further adjusted based at least in part on the received one or more outputs.

2. The method of claim 1, wherein the turbine component comprises a turbine compressor.

3. The method of claim 1, wherein receiving one or more measurements associated with operation of the turbine component comprises receiving one or more measurements associated with an angle of an inlet guide vane of the turbine component, a temperature of the turbine component, a pressure of the turbine component, an inlet bleed heat of the turbine component, or a clearance of the turbine component.

4. The method of claim 1, wherein the predictive model comprises a transient clearance model.

5. The method of claim 1, wherein determining a surge protection limit for the turbine component comprises determining an initial surge protection limit for the turbine component utilizing the cycle model.

6. The method of claim 1, wherein adjusting the surge protection limit comprises adjusting the surge protection limit dynamically during the operation of the turbine component.

7. A system for providing surge protection to a turbine component, the system comprising:
   one or more sensors operable to measure parameters associated with operation of the turbine component; and
   one or more processors operable to:
      determine a surge protection limit for the turbine component;
      receive measurements data from the one or more sensors;
      provide the received measurements data to a cycle model executed by the one or more processors to predict an operating condition of the turbine component, wherein the predicted operating condition of the turbine component is adjusted based at least in part on the received measurements data,
      adjust the surge protection limit based on the adjusted predicted operating condition of the turbine component;
      receive one or more outputs from a predictive model other than the cycle model; and
      provide the received one or more outputs to the cycle model, wherein the predicted operating condition of the turbine component is further adjusted based at least in part on the received one or more outputs.

8. The system of claim 7, wherein the turbine component comprises a turbine compressor.

9. The system of claim 7, wherein the parameters associated with the operation of the turbine component comprise one or more parameters associated with an angle of an inlet guide vane of the turbine component, a temperature of the turbine component, a pressure of the turbine component, an inlet bleed heat of the turbine component, or a clearance of the turbine component.

10. The system of claim 7, wherein the predictive model comprises a transient clearance model.

11. The system of claim 7, wherein the one or more processors are operable to determine a surge protection limit for the turbine component by determining an initial surge protection limit for the turbine component utilizing the cycle model.

12. The system of claim 7, wherein the one or more processors are operable to adjust the surge protection limit dynamically during the operation of the turbine component.

13. A computer program product, comprising a computer usable medium having a computer readable program code embodied therein, the computer readable program code adapted to be executed to facilitate:
   executing a cycle model that is operable to predict an operating condition of a turbine component;
   receiving one or more measurements associated with operation of the turbine component;
   providing the received one or more measurements to the cycle model, wherein the predicted operating condition of the turbine component is adjusted based at least in part on the received one or more measurements;
   adjusting the surge protection limit based on the adjusted predicted operating condition of the turbine component;
   receiving one or more outputs from a predictive model other than the cycle model; and
   providing the received one or more outputs to the cycle model, wherein the predicted operating condition of the turbine component is further adjusted based at least in part on the received one or more outputs.

14. The computer program product of claim 13, wherein the turbine component comprises a turbine compressor.

15. The computer program product of claim 13, wherein the one or more measurements associated with the operation of the turbine component comprises one or more measurements associated with an angle of an inlet guide vane of the turbine component, a temperature of the turbine component, a pressure of the turbine component, an inlet bleed heat of the turbine component, or a clearance of the turbine component.

16. The computer program product of claim 13, wherein the predictive model comprises a transient clearance model.

17. The computer program product of claim 13, wherein the surge protection limit is adjusted dynamically during the operation of the turbine component.

* * * * *